United States Patent [19]

Nishimura

[11] Patent Number: 4,704,554
[45] Date of Patent: * Nov. 3, 1987

[54] CLUTCH MECHANISMS WITH IMPROVED ELECTROMAGNETIC MEANS, SPRING SUPPORTS AND ASSEMBLY VERSATILITY

[75] Inventor: Kozo Nishimura, Akashi, Japan

[73] Assignee: Mita Industrial Co., Ltd., Osaka, Japan

[*] Notice: The portion of the term of this patent subsequent to Feb. 18, 2003 has been disclaimed.

[21] Appl. No.: 847,079

[22] Filed: Apr. 1, 1986

[30] Foreign Application Priority Data

Apr. 15, 1985 [JP] Japan .................................. 60-78439
Mar. 4, 1986 [JP] Japan ............................. 61-30129[U]

[51] Int. Cl.⁴ ...................... F16D 13/08; H02K 49/02
[52] U.S. Cl. ......................................... 310/72; 192/35; 192/81 C
[58] Field of Search .............. 192/35, 415, 48.2, 48.6, 192/81 C, 84 C; 310/71, 75 D, 78, 92, 100, 208, 218, 92; 336/65

[56] References Cited

U.S. PATENT DOCUMENTS

4,126,215 11/1978 Puro ................................... 192/84 C
4,321,992 3/1982 Gallo .................................. 192/84 T
4,386,288 5/1983 Laurie ..................................... 310/71

Primary Examiner—Patrick R. Salce
Assistant Examiner—D. L. Rebsch
Attorney, Agent, or Firm—Beveridge, DeGrandi & Weilacher

[57] ABSTRACT

An electromagnetically controlled spring clutch mechanism comprising an input rotating element, a rotor, an armature, a biasing spring for biasing the armature in a direction away from the rotor, an electromagnetic driver for magnetically attracting the armature to the rotor against the biasing action of the biasing spring, and a coil spring. The clutch mechanism transmits the driving force of the input rotating element by the contraction of the coil spring. According to a first aspect, the biasing spring is fixed to a supporting member by a plate-like spring fixing member to form a unit assembly. According to a second aspect, the clutch mechanism can be used in any one of two arrangements by changing the assembling sequence of various constituent elements. According to a third aspect, projections which contact or approach the rotor beyond the armature are provided in the supporting member, to which one end of the coil spring is connected. According to a fourth aspect, an improvement is made on the electromagnetic drive, which can be applied not only to the electromagnetically controlled spring clutch mechanism, but also to other types of electromagnetic clutch mechanisms.

21 Claims, 9 Drawing Figures

CLUTCH MECHANISMS WITH IMPROVED ELECTROMAGNETIC MEANS, SPRING SUPPORTS AND ASSEMBLY VERSATILITY

FIELD OF THE INVENTION

This invention relates to some improvements in an electromagnetic clutch mechanism.

DESCRIPTION OF THE PRIOR ART

An electromagnetic clutch mechanism has widely been utilized to transmit selectively the driving force of an input rotating element in operation. One type of electromagnetic clutch mechanism is an electromagnetically controlled spring clutch mechanism adapted to transmit the driving force by utilizing the contraction of a coil spring, which is disclosed, for example, in the specification of Japanese Laid-Open Patent Publication No. 175633/1984. The known electromagnetically controlled spring clutch mechanism comprises a shaft member having an input rotating element fixed thereto, a rotor rotating as a unit with the shaft member, an armature disposed on one side of the rotor, a supporting member rotatably mounted on the shaft member, a biasing spring member disposed between the armature and the supporting member, an electromagnetic means for magnetically attracting the armature to one surface of the rotor on said one side, and a coil spring means having one end connected to the supporting member; it transmits the driving force of the input rotating element by the contraction of the coil spring means.

The known electromagnetically controlled spring mechanism, however, has one or more problems to be solved.

Firstly, since the biasing spring member is fixed to the supporting member by a plurality of fixing screws, it is difficult to fix the annular central portion of the biasing spring member substantially uniformly to the end surface of the supporting member. This results in degraded response characteristics. Moreover, the presence of the head portions of the fixing screws makes it difficult to reduce the size of the clutch mechanism.

Secondly, since the electromagnetic means, the rotor, the armature assembly, etc. are constructed separately, if one wants to apply the clutch means to the control of a timing roller in an electrostatic copying apparatus, one must assemble these devices at the time of building the copying apparatus. Consequently, the number of assembling steps required for the copying apparatus increases.

Thirdly, in regard to the mounting of the supporting member on the shaft member, there is some gap between the supporting member and the shaft member. Owing to this gap, the armature tends to be inclined toward the shaft member when the electromagnetic means is out of operation. This results in degraded response characteristics.

Fourthly, the number of production steps is large owing to the structure of the electromagnetic means in the clutch mechanism. Furthermore, it is relatively difficult to automate the assembly line for such an electromagnetically controlled spring clutch mechanism, and the cost of production becomes high.

SUMMARY OF THE INVENTION

A first object of this invention is to provide an electromagnetically controlled spring clutch mechanism in which the biasing spring member can be fixed substantially uniformly to the supporting member, and which can be reduced in size.

A second object of this invention is to provide an electromagnetically controlled spring clutch mechanism which can be very easily assembled, and can be used in any of two arrangements by changing the sequence of assembling.

A third object of this invention is to provide an electromagnetically controlled spring clutch mechanism having excellent response characteristics.

A fourth object of this invention is to provide an electromagnetically controlled spring clutch mechanism which can be built easily and permits automation of assembling.

Other objects of this invention will become apparent from the following description.

According to a first aspect of this invention, there is provided, in accordance with the first object of the invention, an electromagnetically controlled spring clutch mechanism comprising a rotatably mounted shaft member, an input rotating element mounted on the shaft member, a rotor adapted to rotate as a unit with the shaft member, an armature located opposite to one surface of the rotor, a supporting member rotatably mounted on the shaft member, a biasing spring member disposed between the supporting member and the armature for elastically biasing the armature away from said one surface of the rotor, an electromagnetic means adapted to attract the armature magnetically to said one surface of the rotor against the elastic biasing action of the biasing spring member, and a coil spring means having one end connected to the supporting member, said clutch mechanism being adapted to transmit the driving force of the input rotating element by the contraction of the coil spring means; wherein at least said biasing spring member and said supporting member constitute a unit assembly, said unit assembly includes a plate-like spring fixing member, and the biasing spring member is fixed across the spring fixing member and the supporting member by mounting the spring fixing member on the supporting member.

According to a second aspect of this invention, there is provided, in accordance with the second object, an electromagnetically controlled spring clutch mechanism comprising a rotatably mounted shaft member; an input rotating element mounted rotatably on the shaft member; a first boss member adapted to rotate as a unit with the input rotating element; a unit assembly mounted on the shaft member and including a second boss member disposed adjacent to the first boss member and adapted to rotate as a unit with the shaft member via a pin member, a rotor fixed to one end portion of the second boss member, an armature located opposite to one surface of the rotor, a supporting member mounted rotatably on the second boss member, and a biasing spring member disposed between the supporting member and the armature for elastically biasing the armature away from said one surface of the rotor; an electromagnetic means mounted on the shaft member so as to face the other surface of the rotor in the unit assembly and to attract the armature magnetically to said one surface of the rotor against the elastic biasing action of the biasing spring member when energized; and a coil spring means disposed astride the first boss member and the other end portion of the second boss member and wrapped from its one end connected to the unit assembly, its other end connected to the input rotating element in such a direction that it contracts when the unit assembly and the input rotating element are rotated relative to each other incident to the rotation of the input rotating element in a predetermined direction; wherein the shaft member has formed therein a pin hole for fitting the pin member therein, the second boss member has a pin receiving portion at is both end portions, and when the electromagnetic means, the unit assembly and the input rotating element are mounted in this order on the shaft member from its one end toward the other, the pin member fitted in the pin hole of the shaft member engages the pin receiving portion provided at one end portion of the second boss member, and on the other hand, when the input rotating element, the unit assembly and the electromagnetic means are mounted on the shaft member in this order from its one end toward the other, the pin member fitted in the pin hole of the shaft member engages the pin receiving portion provided at the other end portion of the second boss member.

According to a third aspect of this invention, there is provided, in accordance with the third object of this invention, an electromagnetically controlled clutch mechanism comprising a rotatably mounted shaft member, an input rotating element mounted on the shaft member, a rotor adapted to rotate as a unit with the shaft member, an armature located opposite to one surface of the rotor, a supporting member rotatably mounted on the shaft member, a biasing spring member disposed between the supporting member and the armature for elastically biasing the armature away from said one surface of the rotor, an electromagnetic means disposed on the other side of the rotor and adapted to attract the armature magnetically to said one surface of the rotor against the elastic biasing action of the biasing spring member when energized, and a coil spring member having one end connected to the supporting member, said clutch mechanism being adapted to transmit the driving force of the input rotating element by the contraction of the coil spring member; wherein a plurality of spaced-apart projections are provided on that end surface of the supporting member which faces the biasing spring member, and the tips of the projections contact or approach said one surface of the rotor beyond the armature.

According to a fourth aspect of this invention, there is provided, in accordance with the fourth object of the invention, an electromagnetic clutch mechanism comprising an armature and an electromagnetic means for magnetically attracting the armature against the elastic biasing action of a biasing spring member, said electromagnetic means including a cylindrical field having one open end surface, a coil assembly fitted in the cylindrical field and having a bobbin and a coil member wound on the bobbin, and a protective member mounted on a connecting wire portion of the coil member, the outside wall of the field having a securing opening formed on said one surface, and the protective member being fitted in the securing opening through the opening end surface of said field.

DETAILED DESCRIPTION OF PREFERRED EMBODIMENTS

The invention will now be described in detail with reference to the accompanying drawings. In the following, the invention is described with regard to an electromagnetically controlled spring clutch mechanism applied to a timing roller of an electrostatic copying apparatus. But the invention is not limited to this embodiment, and can be applied to the control of the rotation of various other elements.

Figure 1:
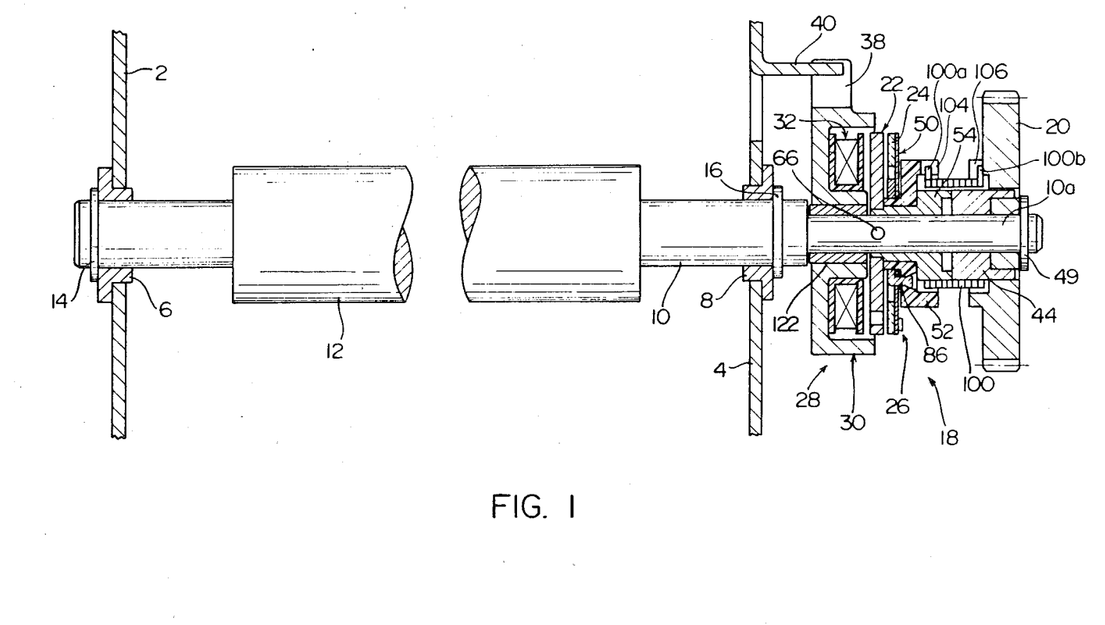
FIG. 1 is a sectional view of one embodiment of the electromagnetically controlled spring clutch mechanism of the invention as applied in a first arrangement to a timing roller of an electrostatic copying apparatus.

In FIG. 1 showing a timing roller and its vicinity of an electrostatic copying apparatus, a vertical front base plate 2 and a vertical rear base plate 4 are disposed in spaced-apart relationship in the front-back direction (the left-right direction in FIG. 1) in the housing of the electrostatic copying apparatus. A supporting shaft 10 (constituting a shaft member) is rotatably mounted across the vertical front base plate 2 and the vertical rear base plate 4 via bearing members 6 and 8, and a timing roller 12 is mounted on an intermediate portion of the supporting shaft 10. One end of the supporting shaft 10 projects slightly forwardly (to the left in FIG. 1) through and beyond the vertical front base plate 2, and an engaging member 14 is mounted on this forwardly projecting portion. The other end portion of the supporting shaft 10 extends through the vertical rear base plate 4 and projects rearwardly (to the right in FIG. 1), and an engaging member 16 is mounted on that site of the rearwardly projecting portion which is outward of the attached site of the bearing member 8. The electromagnetically controlled spring clutch mechanism of this invention shown generally at 18 is attached to the rearwardly projecting portion of the supporting shaft 10.

Figure 2:
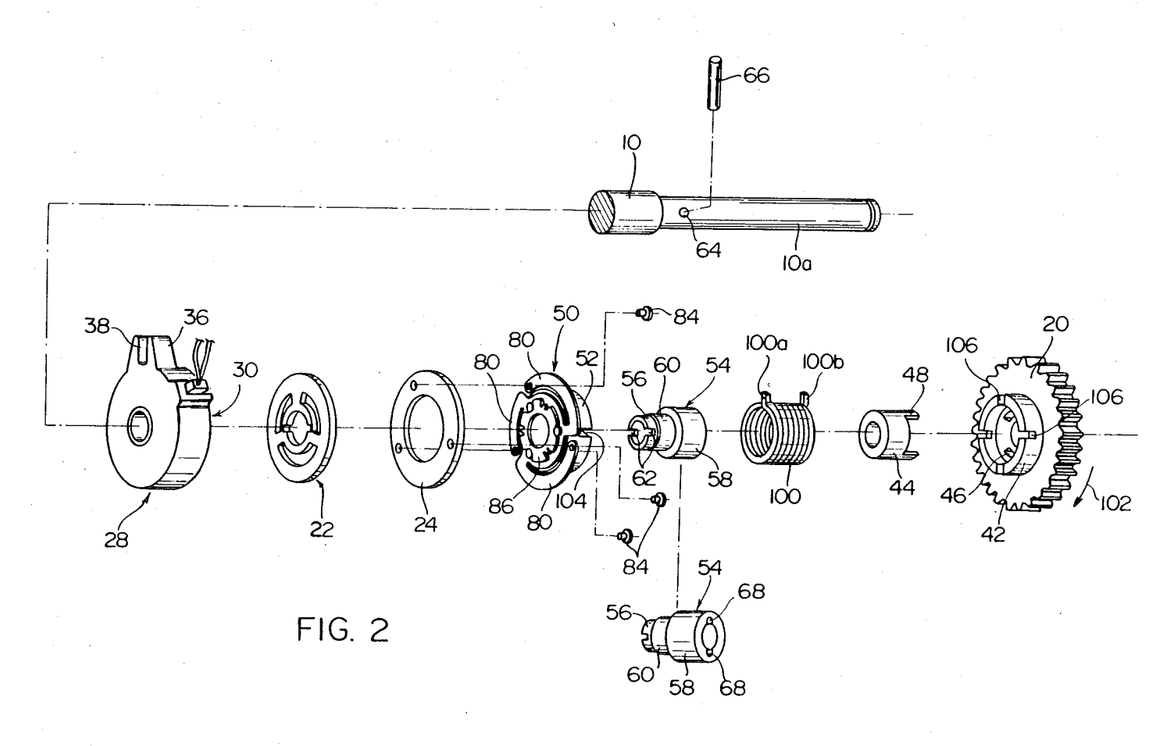
FIG. 2 is an exploded perspective view showing the electromagnetically controlled spring clutch mechanism of FIG. 1.

With reference to FIG. 2 as well as FIG. 1, the illustrated electromagnetically controlled spring clutch mechanism 18 includes an input rotating element 20, a unit assembly including a rotor 22 and an armature 24, and an electromagnetic means 28. As will be described in detail hereinbelow, the electromagnetically controlled spring clutch mechanism 18 can be used in either of two arrangements by changing the sequence of mounting the input rotating element, the unit assembly 26 and the electromagnetic means 28, namely in a first arrangement (shown in FIGS. 1 to 4) in which the electromagnetic means 28, the unit assembly 26 and the input rotating element are arranged on the small-diameter portion 10a formed in the rear end portion of the supporting shaft 10 from its one end portion toward the other (from left to right in FIG. 1), or in a second arrangement (shown in FIG. 9) in which the input rotating element, the unit assembly 26 and the electromagnetic means 28 are arranged in this order on the small-diameter portion 10a from its one end portion toward the other.

With reference mainly to FIG. 2, the structure of the electromagnetically controlled spring clutch mechanism 18 will be described (used in the first arrangement). The electromagnetic means 28 disposed on one end portion of the small-diameter portion 10a of the supporting shaft 10 has a field 30 and a coil assembly 32 received in the field 30, and the field 30 is rotatably mounted on the small-diameter portion 10a (see FIG. 1). An engaging portion 36 is provided on the peripheral surface of the field 30, and a cut 38 is formed in the engaging portion 36. An engaging projection 40 is provided in the vertical rear base plate 4 by bending part of it rearwardly, and held in engagement with the cut 38 of the engaging portion 36 (see FIG. 1). Hence, the electromagnetic means 28 is not turned by the rotation of the supporting shaft 10. The details of the electromagnetic means 28 will be described hereinbelow.

An input rotating element which is disposed on the other end portion of the small-diameter portion 10a and can be constructed of, for example, a gear 20 rotatably mounted on the small-diameter portion 10a. An annular boss portion 42 is formed on one surface (the left surface in FIGS. 1 and 2) of the gear 20 as a unit, and a first cylindrical boss member 44 is received within the boss portion 42. In the illustrated embodiment, the first boss member 44 is adapted to rotate as a unit with the gear 20 by inserting the projection 48 formed on the end surface of the first boss member 44 into a through-hole 46 formed in the side surface of the gear 20. The first boss member 44 extends forwardly in the front-back direction toward a second boss member to be described. If desired, the first boss member 44 may be formed as a unit with the gear 20. The gear 20 is drivingly connected to a driving source such as an electric motor via a suitable gear mechanism, not shown, and rotated in a predetermined direction by the driving source. An engaging member 49 for preventing disengagement of the gear 20, etc. is mounted on that site of the small-diameter portion 10a of the supporting shaft 10 which is outwardly of the site of mounting the gear 20 (which is on the right side in FIG. 1).

Figure 3:
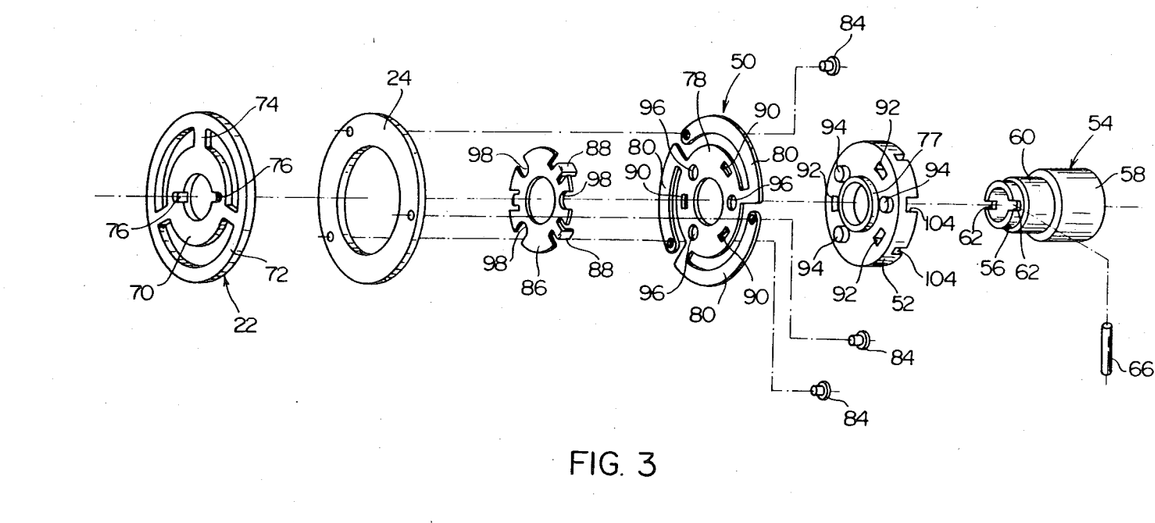
FIG. 3 is an exploded perspective view of a unit assembly in the electromagnetically controlled spring clutch mechanism of FIG. 1.
Figure 4:
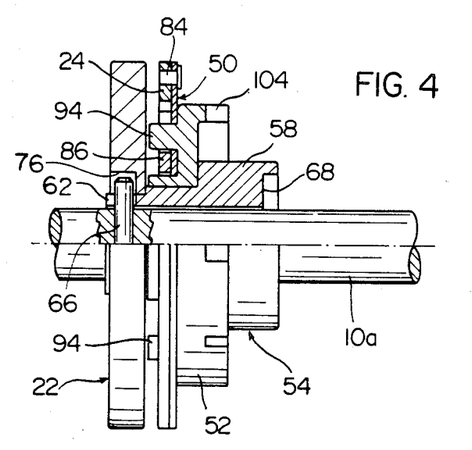
FIG. 4 is a sectional view showing the mounting of the unit assembly.

The unit assembly 26, disposed in an intermediate portion of the small-diameter portion 10a, namely between the electromagnetic means 28 and the gear 20, comprises the rotor 22, the armature 24, a biasing spring 50, a supporting member 52 and a second boss member 54, which constitute one assembly unit. With reference also to FIG. 3, the second boss member 54 has a small-diameter portion 56 formed at its one end portion (the left end portion in FIGS. 1 to 3), a large-diameter portion 58 formed at its other end portion (the right end portion in FIGS. 1 to 3), and a medium-diameter portion 60 provided in its intermediate portion. A pair of cuts 62 defining a pin receiving portion are formed in the small-diameter portion 56 of the second boss member 54. The second boss member 54 is adapted to rotate as a unit with the small-diameter portion 10a by bringing both end portions of a pin member 66 received in a pin hole 64 (FIG. 2) extending through the small-diameter portion 10a of the supporting shaft 10 into engagement with the cuts 62 (FIGS. 1 and 4). In the illustrated embodiments, a pair of depressions 68 defining a pin receiving portion are formed on the other end portion of the second boss portion 54 (FIG. 2). The pair of depressions 68, as will be described hereinbelow, are utilized when the illustrated electromagnetically controlled spring clutch mechanism 18 is used according to the second arrangement shown in FIG. 9. In this case, both end portions of the pin member 66 received in the pin hole 64 are brought into engagement with the pair of depressions 68. Accordingly, when the clutch mechanism 18 is used only according to the first arrangement (FIGS. 1 to 4), the depressions 68 may be omitted. When it is used only according to the second arrangement (FIG. 9), the cuts 62 may be omitted.

The illustrated rotor 22 is composed of an annular plate having an annular base portion 79, an annular portion 72 located outwardly of the annular base portion 70, and a connecting portion 74 connecting the annular base portion 70 and the annular portion 72. Since the rotor 22 is fixed to one end of the second boss member 54 by forcing the annular base portion 70 into the small-diameter portion 56 of the second boss member, it is rotated as a unit with the second boss member 54 and therefore with the supporting shaft 10. In the illustrated embodiment, a pair of depressions 76 are formed in the inner circumferential edge of the annular base portion 70 of the rotor 22 in relation to the fixing of the rotor 22 to the small-diameter portion 56 of the second boss member 54. The depressions 76 formed in the rotor 22 define a pin receiving portion in cooperation with the cuts 62 formed in the second boss member 54, and as shown in FIG. 4, the two opposite end portions of the pin member 64 mounted on the small-diameter portion 10a are received in the cuts 62 and the depressions 76 (therefore, when the rotor 22 is to be fixed to the small-diameter portion 56 of the second boss member 54, the depressions 76 of the rotor 22 are kept in alignment with the cuts 62 of the small-diameter portion 56, and the two are forced into engagement). By employing this construction, even when the engagement between the rotor 22 and the small-diameter portion 56 of the second boss member 54 is relatively weak, the rotor 22 is surely rotated as a unit with the supporting shaft 10 via the pin member 66.

The supporting member 52 is constructed of a shaft cylindrical material, and rotatably mounted on the medium-diameter portion 60 of the second boss member 54. An annular flange 77 is formed on the inner circumferential edge of one end surface (the left surface in FIGS. 1 to 3) of the supporting member 52. Preferably, the supporting member 52 is formed of a light-weight plastic material.

The armature 24 located opposite to one surface (the right surface in FIGS. 1 to 3) of the rotor 22 is made of an annular plate having substantially the same outside diameter as the diameter of the annular portion 72 of the rotor 22, and mounted on the supporting member 52 via biasing spring 50. The biasing spring 50 is mounted on the annular flange 77 of the supporting member 52, and its annular central portion 78 is fixed to one end surface of the supporting member 52 in the manner to be described. The illustrated biasing spring 50 has a plurality of (three in the illustrated embodiment) projections 80 extending in a sickle shape outwardly from the annular central portion 78, and the free end portions of the projecting portions 80 are fixed individually to one surface of the armature 24 (that surface which is opposite to the surface facing the rotor 22) by fixing members 84 such as rivets. The biasing spring 50 serves to bias the armature elastically away from one surface of the rotor 22. In the illustrated embodiment, the biasing spring 50 is fixed to the supporting member 52 as follows: The illustrated unit assembly 18 further includes a plate-like spring fixing member. The illustrated spring fixing member is composed of an annular plate member 86 whose shape corresponds nearly to the shape of the annular central portion 78 of biasing spring 50. On the peripheral edge portion of the plate member 86, a plurality of (three in the illustrated embodiment) circumferentially spaced engaging projections 88 are provided by partly bending it. On the other hand, a plurality of (three in the illustrated embodiment) insertion holes 90 are formed in the annular central portion 78 of biasing spring 50 which correspond respectively to the engaging projections 88, and through-holes 92 are formed on the supporting member 52 correspondingly to the insertion holes 90. Hence, when biasing spring 50 and the plate member 86 are mounted on the annular flange 77 of the supporting member 52, the engaging projections 88 of the plate member 86 project to the other side of the supporting member 52 through the corresponding insertion holes 90 of biasing spring 50 and the corresponding through-holes 92 of the supporting member 52 (as shown by solid lines in FIG. 5). By deforming the projecting ends of the engaging projections 88 in a required manner and keep them in engagement with the other end portion of the supporting member 52, the annular central portion 78 of the biasing spring 50 is fixed between the plate member 86 and the supporting member 52.

Figure 5:
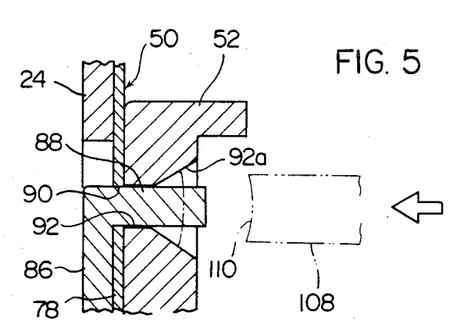
FIG. 5 is a partial enlarged sectional view for illustrating the method of fixing the biasing spring member 50 of the unit assembly shown in FIG. 3.

Preferably, the engaging projections 88 are brought into engagement with the supporting member 52 in the manner shown on an enlarged scale in FIG. 5. Specifically, it is preferred to dilate the right end portion (the right end portion in FIGS. 1 to 3 and 5) of each of the through-holes 92 and to accommodate the deformed portion of each engaging projection 88 in the dilated portion 92a of the through-hole 92. By so doing, an assembly element composed of the supporting member 52, biasing spring 50 and plate member 86 can be reduced in size. When as in the illustrated embodiment the dilated portion 92a is provided in the through-hole 92, it is desirable to make the end of a press tool such as a punch for deforming the engaging projections 88 concave so that its end surface 110 defines an arcuate surface. As a result, the projecting parts of the engaging projections 88 which are projecting as indicated by solid lines in FIG. 5 can be deformed by the action of the press tool 108 to the state shown by one-dot chain lines in FIG. 5, and the deformed portions can be accurately engaged with the dilated portions 92a of the through-holes 92.

In the unit assembly 26 in the illustrated embodiment, a plurality of circumferentially spaced projections 94 are further provided on one end surface of the supporting member 52, and a plurality of circumferentially spaced openings 96 defining projection receiving portions are provided in the annular central portion 78 of biasing spring 50 to correspond to the projections 94. The tip portion of each of the projections 94 extends through the opening 96 of the biasing spring 50, further stretches out toward one surface of the rotor 22 beyond the plate member 86 and the armature 24, and contacts or approaches one surface of the rotor 22 (see FIG. 4).

In the illustrated embodiment, arcuate cuts 98 corresponding to the openings 96 are formed on the peripheral edge portion of the plate member 86 in relation to the extending of the projections 94 as stated above. Accordingly, the projections 94 are respectively received in the openings 96 and the cuts 98 and act to transmit the driving force between the supporting member 52 and biasing spring 50 (in other words, they act to receive a radial load, i.e. a load in the rotating direction, generated between the supporting member 52 and biasing spring 50), and increases the response characteristics of the clutch mechanism 18 as will be described hereinafter. To increase the response characteristics of the clutch mechanism 18 further, it is preferred to project the end portion of the annular flange 77 of the supporting member 52 also beyond the biasing spring 50 and plate member 86 and to cause its end to contact or approach one surface of the rotor 22. In the illustrated embodiment, the end surfaces of the projections 94 and the end surface of the annular flange 77 define substantially the same plane substantially parallel to one surface of the rotor 22 (see FIG. 4).

A coil spring means 100 is put over the first boss member 44 fitted in the gear 20 and the other end portion, i.e. the large-diameter portion 58, of the second boss member 54 of the unit assembly 26. With reference to FIGS. 1 and 2, the large-diameter portion 58 of the second boss member 54 extends toward the first boss member 44, and the end surfaces of the two boss members 44 and 54 contact or approach each other. The outside diameter of the large-diameter portion 58 is substantially equal to the outside diameter of the first boss member 44, and the coil spring means 100 strides across the large-diameter portion 58 and the first boss member 44. In the illustrated embodiment, the coil spring means 100 is wound in the right direction as viewed from the left side of FIGS. 1 and 2 (therefore, in such a direction that it contracts when, during the rotation of the gear 20 in the direction of an arrow 102, a force acts on the supporting member 52 so as to hamper its rotation, and the supporting member is rotated relative to the gear 20). One end 100a of the coil spring means 100 is linked to the supporting member 52 by being inserted into a cut 104 formed in the other end portion of the supporting member 52 (i.e., one of a plurality of circumferentially spaced cuts 104 in the illustrated embodiment). Its other end 100b is linked to the gear 20 by being inserted into a cut 106 (one of four circumferentially spaced cuts 106 in the illustrated embodiment) formed in the annular boss portion 42 of the gear 20.

Now, with reference to FIGS. 6 to 8, the electromagnetic means 28 will be described. The illustrated electromagnetic means 28 includes the cylindrical field 30, coil assembly 32 and protective member 112. The field 30 has a nearly circular end wall 113 with a circular opening formed centrally thereof. Cylindrical outside wall 114 and 115 each extending toward one side (to the right in FIG. 7) are provided in the outer circumferential portion and inner circumferential portion respectively of the end wall 113, and one end surface of the field 30 is opened. As clearly shown in FIG. 8, a securing opening 116 opened to the aforesaid one end surface of the field 30 is formed in the outside wall 114. In the illustrated embodiment, the securing opening 116 is substantially rectangular and extends from one open end surface of the field 30 toward its other end and terminates at the inner surface of the end wall 113

Figure 6:
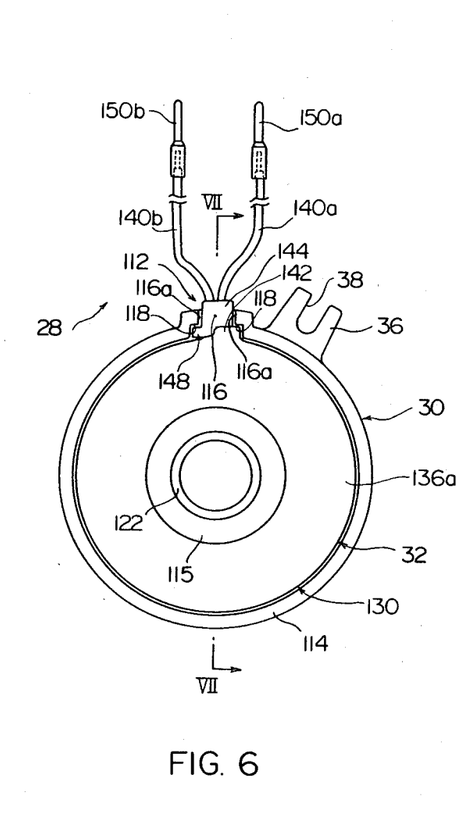
FIG. 6 is a front elevation, partly broken away, of the electromagnetic means of the electromagnetically controlled spring clutch mechanism of FIG. 1.
Figure 7:
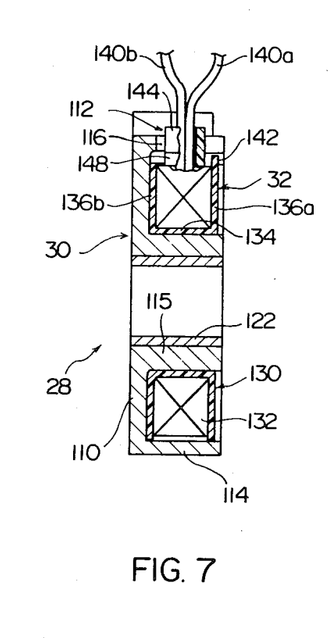
FIG. 7 is a sectional view taken along line VII—VII of FIG. 6.
Figure 8:
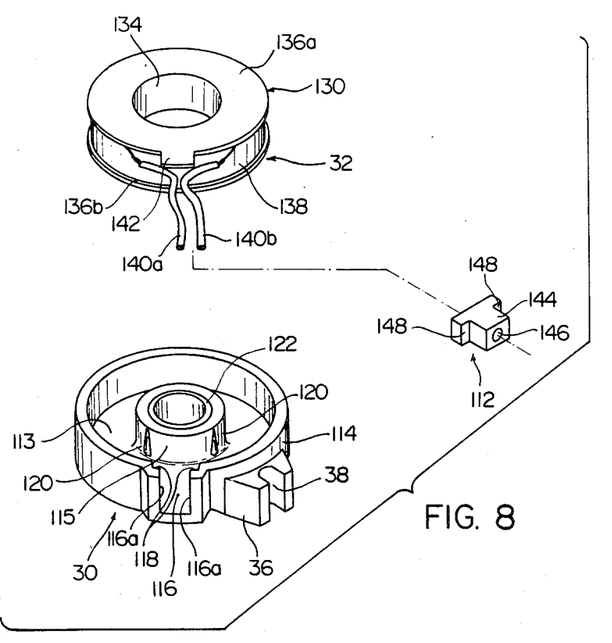
FIG. 8 is an exploded perspective view showing the electromagnetic means of FIG. 6.

(FIGS. 7 and 8). In the illustrated field 30, a shoulder portion 118 is provided at two opposite sites defining the side surfaces of the securing opening 116 of the outside wall 114 (FIGS. 6 and 8). The shoulder portion 118 extends from one end to the other end of the field 30 in the mounting direction of the protective member 112 to be described. A fixing projection 120 slightly projecting radially outwardly is provided in the outer surface of the inside wall 115 of the field 30 (that surface which faces the inner surface of the outside wall 114). In the illustrated embodiment, three projections (two of which are shown in FIG. 8) are provided at circumferentially spaced intervals on inner wall 115. As shown in FIG. 8, the projections 120 are preferably of such a shape that the amount of their radially outward projection increases progressively toward the mounting direction of the coil assembly 32 to be described. A sleeve-like bearing member 122 is fixed to the inner surface of the inside wall 115 of the field 30, and an engaging portion 36 having a cut 38 is provided on the outside surface of the outside wall 114. As can be seen from FIG. 8, the field 30 having the aforesaid sturcture can be easily formed as a one-piece unit by sintering. By forcing the bearing member 122 into the inside wall of the field 30 molded by sintering, the field 30 is built in the form shown in FIG. 8.

The coil assembly 32 includes a bobbin 130, and a coil member 132 wound on the bobbin 130. The bobbin 130 has a hollow sleeve portion 134 and annular flange portions 136a and 136b provided in opposite ends of the sleeve portion 134, and is formed as a one-piece unit from a synthetic resin or ceramics. The coil member 132, as shown in FIG. 7, is wound on the peripheral surface of the sleeve portion 134 of the bobbin 130 and located between the flange portions 136a and 136b. As shown in FIG. 8, the coil member 132 wound on the bobbin 130 is covered with a tape-like seal member 138, and only its both end portions are exposed. Lead wires 140a and 140b constituting a connecting wire portion are connected to both end portions of the coil member 132, and by connecting the lead wires 140a and 140b, the coil assembly 32 is built in the form shown in FIG. 8. Preferably, in the coil assembly 32, a positioning projection 142 projecting radially outwardly is provided in the peripheral edge of at least one of the flange portions 136a and 136b. More preferably, the positioning projection 142 is provided in the flange portion 136a as shown in the illustrated embodiment.

The protective member 112 has a main body portion 144. In the illustrated embodiment, the main body portion 144 has a rectangular cross-sectional surface and includes an axially extending through-hole 146 formed centrally thereof and outwardly extending engaging projections 148 provided respectively on two opposite surfaces of one end portion of the main body. The protective member 112 of such a structure can be formed, for example, as a one-piece unit from a synthetic resin or ceramics.

The electromagnetic means 28 is built in the form shown in FIGS. 6 and 7 (i.e., FIG. 2) by assembling the field 30, coil assembly 32 and protective member 112 by the following procedure.

Specifically, a vinyl resin-jacketed electric wire is cut to a given length, and a pair of lead wires 140a and 140b are formed. As shown in FIG. 6, connecting terminals 150a and 150b are press-bonded to end portions of the lead wires 140a and 140b respectively. Since each of the lead wires 140a and 140b has nothing connected to both ends, the press bonding of the connecting terminals 150a and 150b can be carried out easily and simply. Hence, the press-bonding step can be easily automated.

The other end portions of the lead wires 140a and 140b are then connected to the two opposite end portions of the coil member 132 wound on the bobbin 130. As a result, the coil assembly 106 is built in the form shown in FIG. 8.

Thereafter, the lead wires 140a and 140b (constituting the connecting portion of the coil member 132) connected to the coil member 132 are inserted into the through-hole 146 of the protective member 112 to position the protective member 112 at the other end portions of the lead wires 140a and 140b. Then, the protective member 112 is fitted in the securing opening 116 formed in the field 30, and the coil assembly 32 is mounted in position within the field 30. In this fitting operation, the main body portion 144 of the protective member 112 is brought into alignment with the securing opening 116 at the aforesaid one end surface of the field 30 and the engaging projection 148 of the protective member 112 is also brought into alignment with the shoulder portions 118 provided at the sites defining the securing opening 116 of the field 30. In the coil assembly 32, the bobbin 130 is positioned between the inside wall 115 and the outside wall 114 of the field 30 at the aforesaid one end surface side of the field 30, and the positioning projection 142 of the bobbin 130 is brought into alignment with the shoulder portions 118 provided in the field 30. The protective member 112 is inserted into the securing opening 116 in its mounting direction, namely to the left in FIG. 7, and simultaneously, the bobbin 130 is forced into the field 30 through the aforesaid open end surface in its mounting direction, namely to the left in FIG. 7. As a result, the electromagnetic means is built as shown in FIGS. 6 and 7. The main body portion 144 of the protective member 112 is thus situated in the securing opening 116 and projects outwardly of the outside wall 114 of the field 30, whereby the lead wires 140a and 140b are surely prevented from making direct contact with that edge portion of the field which defines the securing opening 116. Furthermore, the engaging projection 148 of the protective member 112 abuts against the shoulder portions 118 to prevent the protective member 112 from slipping off from the opening 116. Furthermore, the fixing projection 120 provided in the inside wall 115 of the field 30 acts on the inner surface of the sleeve portion 134 of the bobbin 130 to prevent bobbin 130, and therefore coil assembly 32, from slipping off. In the prior art, the coil assembly is fixed by caulking part of the inside wall of the field, and therefore, a special tool for this is required. In the specific embodiment of the present invention, however, no such special tool for exclusive use is required since the coil assembly 32 is forced into the field 30. The assembling of the field 30 is therefore easier and simpler.

The fixing projection 120 may be provided on the inner circumferential surface of the sleeve portion 134 of the bobbin 130 instead of the inside wall 114 of the field 30. To fix the coil assembly 32 more firmly, it is possible to fix the bobbin 130 together with the fixing projection 120 by means of an adhesive. When the coil assembly 32 has been fitted, the positioning projection 142 provided in the flange portion 136a of the bobbin 130 is positioned at the shoulder portions 118 at one end portion of the field 30. Hence, the protective member 112 can be accurately prevented from slipping off from the securing opening 116, and is fitted exactly in the securing opening 116 in the state shown in FIGS. 6 and 7. As can be easily understood from FIGS. 6 and 7, when the positioning projection 142 is provided in the flange portion 136a located in the one end surface side of the field 30 acts to position the bobbin 130 properly with respect to the field 30 at the time of mounting or more specifically, it is situated at the shoulder portions 118 to hamper rotation of the bobbin 130 relative to the field 30, position the other end portions of the lead wires 140a and 140b at the securing opening, and also acts to prevent the protective member 112 from slipping off from the securing opening 116. But when it is provided in the flange portion 136b located in the other end surface side of the field 30, it performs only the positioning action mentioned above. In the electromagnetic means 28 having the structure described above, the protective member 112 can be fitted in position into the field 30 through the securing opening 116 formed in the field 30 while the protective member 112 is being attached to the lead wires 140a and 140b of the coil member 132. Accordingly, the mounting procedure in accordance with this invention can obviate the step of leading out a connecting wire portion in the prior art (in the prior art, hole is formed in the outside wall of the field and the connecting wire portion is led out through the hole), and the step of forcing the protective member in the prior art (in the prior art, the protective member attached to the connecting wire portion is forced into the hole formed in the outside wall of the field). Consequently, the assembling of the electromagnetic means 28 is easy and simple, and can conveniently be automated.

It will be understood that the electromagnetic means 28 described above can be used for the electromagnetically controlled spring clutch mechanism 18, and can also be applied to other various electromagnetic clutch mechanisms.

Again with reference to FIG. 1, the clutch mechanism 18 is composed of substantially four assembling elements, i.e. the electromagnetic means 28, the unit assembly 26, the coil spring means 100 and the gear 20, as can be easily seen from the foregoing description. By mounting these elements on the small-diameter portion 10a of the supporting shaft 10 in the following manner, the clutch mechanism can be used in the first arrangement. When it is desired to use the clutch mechanism 18 in the first arrangement, the electromagnetic means 28 is first mounted, and then the pin member 66 is fitted in the pin hole 64 of the small-diameter portion 10a (the pin member 66 has a length slightly larger than the diameter of the small-diameter portion 10a, and therefore, when fitted in position, its both ends project from the small-diameter portion 10a as indicated in FIG. 4). The unit assembly 26 is further mounted, and both end portions of the pin member 66 is positioned in the pin-receiving portion defined by the cuts 62 of the second boss member 54 and the depressions 76 of the rotor 22. One end portion of the coil spring means 100 is then put over the large-diameter portion 58 of the second boss member 54, and its one end 100a is inserted into the cut 104 of the supporting member 52. The gear 20 is then mounted, and the first boss member 44 attached to the gear 20 is positioned in the other end portion of the coil spring means 100. Its other end 100b is inserted into the cut 106 formed in the annular boss portion 42 of the gear 20, and thereafter, the engaging member 49 is held into engagement with the other end (the right end in FIG. 1) of the small-diameter portion 10a. As a result, these elements are mounted in position on the small-diameter portion 10a of the supporting shaft 10. Since the number of the mounting elements is small, the number of assembling steps decreases, and the assembling can be effected easily and rapidly.

In the first arrangement described above, the coil assembly 32 of the electromagnetic means 28 is disposed on the other side of the rotor 22, and the electromagnetic means 28 is prevented from rotation by the engaging projection 40. The second boss member 54 and the rotor 22 rotate as a unit with the supporting shaft 10 via the pin member 66, and the supporting member 52 and the armature 24, the biasing spring member 50 and the plate member 86 mounted on it are rotatable with respect to the second boss member 54, and therefore, to the supporting shaft 10. The gear 20 and the first boss member 44 attached to it are rotatable with respect to the supporting shaft 10.

When an electric current is supplied to the coil assembly 32 in the first embodiment, the magnetic attracting force of the electromagnetic means 28 moves armature 24 to the left in FIG. 1 against the elastic biasing action of the biasing spring member 50, attracted to one surface of rotor 22, whereby the armature 24 and the rotor 22 are kept in connection. The gear 20 is rotated in the direction of arrow 102 (FIG. 2), and the supporting member 52 is also rotated in the same direction via the coil spring means 100 (biasing spring 50 and the armature 24 are also rotated as a unit with the supporting member 52). Accordingly, when the armature 24 and the rotor 22 are magnetically attracted to each other and kept in connection, a force acts on the supporting member 52 to hamper its rotation because the supporting shaft 10 is stopped. This rotation hampering force produces a relative difference in velocity between the gear 20 and the supporting member 52, which in turn causes contraction of the coil spring means 100. As a result, the first boss member 44 and the second boss member 54 are connected through the coil spring means 100, and the supporting shaft 10 is drivingly connected to the gear 20 via the pin member 66, the second boss member 54, the coil spring means 100 and the first boss member 44. The rotating force of the gear 20 is transmitted to the supporting shaft 10 to rotate the supporting shaft 10, and therefore, the timing roller 12 mounted on it, in the direction of arrow 102 (FIG. 3) incident to the rotation of the gear 20 whereby a copying paper sheet is conveyed in a required manner.

When the supply of current to the coil assembly 32 is stopped, the electromagnetic means 28 is deenergized. As a result, the armature 24 moves to the right in FIG. 1 away from one surface of the rotor 22 by the elastic biasing action of the biasing spring 50, and the foresaid connection between the armature 24 and the rotor 22 is cancelled (in other words, the armature 24 returns to the position shown in FIG. 1 by the action of the biasing spring member 50). At the time of returning the armature 24, the armature is moved away from the one surface of the rotor 22 by the elastic biasing action of the biasing spring 50 interposed between the supporting member 52 and the armature 24. Hence, the connection between the armature 24 and the rotor 22 is rapidly cancelled. Furthermore, during this returning movement, the armature 24 tends to be inclined slightly with respect to the supporting shaft 10 owing to the existence of a gap between the outer circumferential surface of the medium-diameter portion 60 of the second boss member 54 and the inner circumferential surface of the supporting member 52. Since in the illustrated embodiment, the projection 94 provided on one end surface of the supporting member 52 is in contact with, or in proximity to, one surface of the rotor 22, it will be easily understood from FIG. 4 that when the armature 24 is slightly tilted, the forward end surface of the projection 94 makes contact with one surface of the rotor 22, and therefore, a reduction in response characteristics due to the contacting of the armature 24 with one surface of the rotor 22 can be effectively prevented. Furthermore, since in the illustrated embodiment, the end of the annular flange 77 of the supporting member 52 is also kept in contact with, or in proximity to, one surface of the rotor 22, the play of the supporting member 52 can be reduced, and the deterioration of response characteristics can further be prevented. When the connection between the armature 24 and the rotor 22 is broken, the supporting member 52 is further turned a little in the direction of arrow 102 by the elastic force of the coil spring means 100 which has been accumulated during the aforesaid transmission of the driving force, and the coil spring means 100 is expanded. At the time of expanding the coil spring means 100, the supporting member 52 is rotatably mounted on the second boss member 54. Since only the biasing spring member 50, the armature 24 and the plate member 86 are mounted on the supporting member 52, the supporting member 52 is rotated easily and rapidly by the elastic force of the coil spring means 100 without undergoing high resistance. When the coil spring means 100 is thus expanded, the connection between the first boss member 44 and the second boss member 54 by the coil spring means 100 is broken, and the driving connection between the gear 20 and the supporting shaft 10 is consequently broken. It will be easily appreciated that during the deenergization of the electromagnetic means 28, only the supporting member 52, the biasing spring means 50 and the armature 22 are rotated via the coil spring means 100 incident to the rotation of the gear 20, and the supporting shaft 10, and therefore the timing roller 12, are kept from rotation.

Since in the illustrated clutch mechanism 18, the rotor 22, the armature 24, the biasing spring member 50, the supporting member 52 and the second boss member 54 are formed as a unit, the number of mounting elements can be greatly decreased as compared with the prior art, and the distance between the rotor 22 and the armature 24, which is of particular importance, can be maintained constant. Furthermore, since the armature 24 is fixed to one end surface of the supporting member 52 by the plate member 86 via the biasing spring member 50, the plate member 86 acts substantially uniformly on almost all the area of the annular central portion 78 of the armature 24, whereby the annular central portion 78 can be fixed accurately across the plate member 86 and the supporting member 52, and the assembling element composed of the biasing spring member 50, the supporting member 52, and the plate member 86 can be reduced in size. Furthermore, as a result of the fixation of the armature 24 to one end surface of the supporting member 52 through the biasing spring member 50 as mentioned above, the deformation of the armature 24 resulting from its fixation to the supporting member 52 in the prior art can be prevented, and consequently, the response characteristics are also improved.

Figure 9:
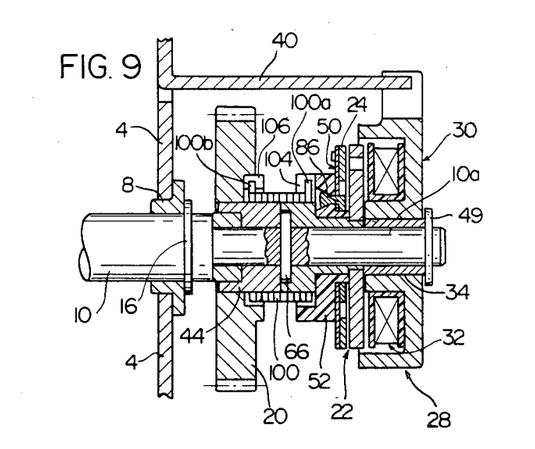
FIG. 9 is a sectional view of the electromagnetically controlled spring clutch mechanism of FIG. 1 as applied in a second arrangement.

The electromagnetically controlled spring clutch mechanism 18 can be used in the second arrangement shown in FIG. 9 by mounting the electromagnetic means 28, the unit assembly 26, the coil spring means 100 and the gear 20 in the following manner. When it is desired to use the clutch mechanism 18 according to the second arrangement shown in FIG. 9, the gear 20 is first mounted in such a manner that the first boss member 44 on which it is mounted extends to the right in FIG. 9. Then, the pin member 66 is fitted in the pin hole 64 of the small-diameter portion 10a. The other end portion of the coil spring means 100 is then put over the first boss member 44 attached to the gear 20, and its other end 100b is inserted into the cut 106 formed in the annular boss portion 42 of the gear 20. Thereafter, the unit assembly 26 is mounted such that the second boss member 54 faces the first boss member 44. The large-diameter portion 58 of the second boss member 54 of the unit assembly 26 is positioned within one end portion of the coil spring means 100, and both end portions of the pin member 66 are kept in engagement with the pin receiving portion defined by the depression 68 of the second boss member 54. Furthermore, the one end 100a of the coil spring means 100 is inserted into the cut 104 formed in the supporting member 52 of the unit assembly 26. Thereafter, the electromagnetic means 28 is mounted in position (in the electromagnetic means 28, the engaging projection 40 provided in the vertical rear base plate 4 is received in the cut 38 of the engaging portion 36 provided in the field 30 as in the first arrangement), and the engaging member 49 is brought into engagement with the other end of the small-diameter portion 10a. As a result, the aforesaid elements are mounted in position on the small-diameter portion 10a of the supporting shaft 10 as shown in FIG. 9.

In the second arrangement, the coil assembly 32 of the electromagnetic means 28 is disposed on the other side of the rotor 22, and the rotation of the electromagnetic means 28 is hampered by the engaging projection 40 of the electromagnetic means 28, as in the first arrangement. The second boss member 54 and the rotor 22 rotate as a unit with the supporting shaft 10 via the pin member 66, and the supporting member 52 and armature 24, biasing spring 50 and plate member 86 mounted on it are rotatable with respect to the second boss member 54 and therefore the supporting shaft 10. Furthermore, the gear 20 and the first boss member 44 mounted on it are rotatable with respect to the supporting shaft 10. It will be easily understood by comparing FIG. 1 with FIG. 9 that in the second arrangement, the mounting position of the gear 20 is nearer to the vertical rear base plate 4 by a predetermined amount than in the first arrangement (that is, the mounting position of the gear 20 is one end portion of the small-diameter portion 10a of the supporting shaft 10).

When the clutch mechanism 18 is used in the second arrangement, substantially the same effects as in the first arrangement can be achieved. In other words, when the electromagnetic means 28 is energized, the coil spring means 100 contracts as stated above to bring the first boss member 44 and the second boss member 54 into connection to each other via the coil spring means 100. As a result, the rotating force of the gear 20 is transmitted to the supporting shaft 10 via the first boss member 44, the coil spring means 100, the second boss member 54 and the pin member 66. On the other hand, when the electromagnetic means 28 is deenergized, the coil spring means 100 is expanded to cancel the connection between the first boss member 44 and the second boss member 54 by the coil spring means 100. As a result, the driving connection between the gear 20 and the supporting shaft 10 is cancelled. During the deenergization of the electromagnetic means 28, only the supporting member 52, biasing spring 50 and the armature 22 rotate via the coil spring means 100 incident to the rotation of the gear 20, and the supporting shaft 10 is kept from rotation.

Accordingly, the electromagnetically controlled spring clutch mechanism 18 in the illustrated embodiment can be used in two arrangements by changing the sequence of mounting the assembling elements, and can be used in a wide range of applications without changing the design.

While the invention has been described above with reference to one specific embodiment shown in the attached drawings, it should be understood that the invention is not limited to such a specific embodiment, and various changes and modifications are possible without departing from the scope of the invention described and claimed herein.

What we claim is:

1. An electromagnetically controlled spring clutch mechanism comprising a rotatably mounted shaft member, an input rotating element mounted on the shaft member, a rotor mounted for rotation as a unit with the shaft member, an armature located opposite to one surface of the rotor, a supporting member rotatably mounted on the shaft member, a biasing spring member disposed between the supporting member and the armature for elastically biasing the armature away from said one surface of the rotor, an electromagnetic means adapted to attract the armature magnetically to said one surface of the rotor against the elastic biasing action of the biasing spring member when energized, and a coil spring means having one end connected to the supporting member, said clutch mechanism being adapted to transmit the driving force of the input rotating element by the contraction of the coil spring means; wherein at least said biasing spring member and said supporting member constitute a unit assembly, said unit assembly includes a plate-like spring fixing member, and the biasing spring member is fixed across the spring fixing member and the supporting member by mounting the spring fixing member on the supporting member.

2. The clutch mechanism of claim 1 wherein the biasing spring member has an annular central portion and a plurality of projections extending in a sickle form from the annular central portion, and the spring fixing member is constructed of an annular plate member whose shape corresponds nearly to the shape of the annular central portion of the biasing spring member.

3. The clutch mechanism of claim 2 wherein a plurality of circumferentially spaced insertion holes are formed in the annular central portion of the biasing spring member; a plurality of engaging projections corresponding to said insertion holes are provided on the peripheral edge portion of the plate member; and the biasing spring member is fixed across the plate member and the supporting member by bringing the individual engaging projections into engagement with the supporting member through the insertion holes.

4. The clutch mechanism of claim 2 wherein a plurality of spaced projections for transmission of a driving force are provided on one end surface of the supporting member which faces the biasing spring member; a plurality of projection receiving portions corresponding to the projections for transmission of the driving force are formed in the annular central portion of the biasing spring member; and said projections are received in the receiving portions.

5. The clutch mechanism of claim 2 wherein the unit assembly includes said armature, and the free end portions of the projections of the biasing spring member are fixed to the armature.

6. The clutch mechanism of claim 5 wherein said mechanism further includes a first boss member adapted to rotate as a unit with the input rotating element and a second boss member mounted adjacent to the first boss member on the shaft member and adapted to rotate as a unit with the first boss member; the unit assembly further includes said second boss member; the supporting member is rotatably mounted on the second boss member; the input rotating element is rotatably mounted on the shaft member; the coil spring means is put astride the first boss member and the second boss member and wound from one end connected to the supporting member to the other end connected to the input rotating element in such a direction that it contracts when the supporting member and the input rotating element are rotated relative to each other incident to the rotation of the input rotating element in a predetermined direction; and the shaft member constitutes an output rotating shaft.

7. The clutch mechanism of claim 6 wherein the unit assembly also includes the rotor and the rotor is fixed to the second boss member.

8. The clutch mechanism of claim 1 wherein the shaft member is a supporting shaft on which a timing roller for starting the conveying of a copying paper sheet in an electrostatic copying apparatus is mounted.

9. An electromagnetically controlled spring clutch mechanism comprising a rotatably mounted shaft member; an input rotating element mounted rotatably on the shaft member; a first boss member mounted for rotation as a unit with the input rotating element; a unit assembly mounted on the shaft member and including a second boss member disposed adjacent to the first boss member and adapted to rotate as a unit with the shaft member via a pin member, a rotor fixed to one end portion of the second boss member, an armature located opposite to one surface of the rotor, a supporting member mounted rotatably on the second boss member, and a biasing spring member disposed between the supporting member and the armature for elastically biasing the armature away from said one surface of the rotor; an electromagnetic means mounted on the shaft member so as to face the other surface of the rotor in the unit assembly and being adapted to attract the armature magnetically to said one surface of the rotor against the elastic biasing action of the biasing spring member when energized; and a coil spring means disposed astride the first boss member and the other end portion of the second boss member and wrapped from its one end connected to the unit assembly to its other end connected to the input rotating element in such a direction that it contracts when the unit assembly and the input rotating element are rotated relative to each other incident to the rotation of the input rotating element in a predetermined direction; wherein the shaft member has formed therein a pin hole for fitting the pin member therein, the second boss member has a pin receiving portion at its both end portions, and when the electromagnetic means, the unit assembly and the input rotating element are mounted in this order on the shaft member from its one end toward the other, the pin member fitted in the pin hole of the shaft member engages the pin receiving portion provided at one end portion of the second boss member, and on the other hand, when the input rotating element, the unit assembly and the electromagnetic means are mounted on the shaft member in this order from its one end toward the other, the pin member fitted in the pin hole of the shaft member engages the pin receiving portion provided at the other end portion of the second boss member.

10. The clutch mechanism of claim 9 wherein the biasing spring means of the unit assembly has an annular central portion and a plurality of projections extending in a sickle form from the annular central portion; the annular central portion is fixed to the supporting member; and the free end portions of the projections are fixed to the armature.

11. The clutch mechanism of claim 10 wherein the unit assembly further includes a plate-like spring fixing member, and the biasing spring member is fixed across the spring fixing member and the supporting member by mounting the spring fixing member on the supporting member.

12. The clutch mechanism of claim 11 wherein the spring fixing member is constructed of an annular plate member whose shape corresponds nearly to the shape of the annular central portion of the biasing spring member; a plurality of engaging projections are formed on the peripheral edge portion of the plate member; a plurality of insertion holes corresponding to the engaging projections are formed in the annular central portion of the biasing spring member; and the biasing spring member is fixed across the plate member and the supporting member by bringing the engaging projections into engagement with the supporting member through the insertion holes.

13. The clutch mechanism of claim 9 wherein the shaft member is a supporting shaft on which a timing roller for starting the conveying of a copying paper sheet in an electrostatic copying apparatus is mounted.

14. An electromagnetically controlled clutch mechanism comprising a rotatably mounted shaft member, an input rotating element mounted on the shaft member, a rotor mounted for rotation as a unit with the shaft member, an armature located opposite to one surface of the rotor, a supporting member rotatably mounted on the shaft member, a biasing spring member disposed between the supporting member and the armature for elastically biasing the armature away from said one surface of the rotor, an electromagnetic means disposed on the other side of the rotor and adapted to attract the armature magnetically to said one surface of the rotor against the elastic biasing action of the biasing spring member when energized, and a coil spring member having one end connected to the supporting member, said clutch mechanism being adapted to transmit the driving force of the input rotating element by the contraction of the coil spring member; wherein a plurality of spaced-apart projections are provided on that end surface of the supporting member which faces the biasing spring member, and the tips of the projections contact or approach said one surface of the rotor beyond the armature.

15. The clutch mechanism of claim 14 wherein an annular flange is provided on the inner circumferential surface of one end surface of the supporting member, and the end of the annular flange is caused to contact or approach said one surface of the rotor beyond the biasing spring member and the armature.

16. The clutch mechanism of claim 15 wherein the end surfaces of the projections and the end surface of the annular flange define substantially the same plane substantially parallel to said one surface of the rotor.

17. The clutch mechanism of claim 14 wherein the rotor, the biasing spring member and the supporting member constitute a unit assembly; the biasing spring member has an annular central portion and a plurality of projections extending therefrom in a sickle form; the annular central portion is fixed to the supporting member; and the free end portions of the projections are fixed to the armature.

18. The clutch mechanism of claim 17 wherein said projections are for transmitting a driving force; a plurality of projection receiving portions corresponding to the projections are formed in the annular central portion of the spring biasing spring member; and the end portions of the projections are received in the projection receiving portions and caused to contact or approach said one surface of the rotor beyond the armature.

19. The clutch mechanism of claim 17 wherein said mechanism further includes a first boss member adapted to rotate as a unit with the input rotating element and a second boss member mounted adjacent to the first boss member on the shaft member and adapted to rotate as a unit with the shaft member; the unit assembly further includes the second boss member and the rotor; the rotor is fixed to one end portion of the second boss member and the supporting member is rotatably mounted on the intermediate portion of the second boss member; the input rotating element is rotatably mounted on the shaft member; the coil spring means is put astride the first boss member and the other end portion of the second boss member and is wrapped from its one end connected to the supporting member to its other end connected to the input rotating element in such a direction that it contracts when the supporting member and the input rotating element are rotated relative to each other incident to the rotation of the input rotating element in a predetermined direction; and the shaft member constitutes an output shaft.

20. An electromagnetic clutch mechanism comprising an armature and an electromagnetic means for magnetically attracting the armature against the elastic biasing action of a biasing spring member, said electromagnetic means including a cylindrical field having one open end surface, a coil assembly fitted in the cylindrical field and having a bobbin and a coil member wound on the bobbin; said bobbin having a sleeve portion on which the coil member is wound, and flange portions provided respectively at both ends of the sleeve portion; a positioning projection provided in at least one of the flange portions, said positioning projection being provided in that flange portion which is positioned in one end surface side of the field, and a protective member mounted on a connecting wire portion of the coil member, the outside wall of the field having a securing opening formed on said one surface, shoulder portions formed at that site of the field which defines the securing opening, said shoulder portions extending in the direction of the protective member, and the protective member being fitted in the securing opening through the open end surface of said field, said protective member having engaging projections adapted to engage the shoulder portions and a main body portion projecting outwardly of the field through the securing opening, said positioning projection on the bobbin flange being positioned in said one end surface side of the field so as to prevent the protective member from slipping off from the securing opening.

21. The clutch mechanism of claim 20 wherein a fixing projection for fixing the bobbin is provided in the inside wall of the field, or in the bobbin of the coil assembly.

* * * * *